United States Patent [19]

Sternberg

[11] 3,917,513

[45] Nov. 4, 1975

[54] REMOVAL OF TRANSGLUCOSIDASE FROM AMYLOGLUCOSIDASE

[75] Inventor: Moshe Sternberg, South Bend, Ind.

[73] Assignee: Miles Laboratories, Inc., Elkhart, Ind.

[22] Filed: Dec. 28, 1970

[21] Appl. No.: 102,229

[52] U.S. Cl............................................. 195/66 R
[51] Int. Cl.² ......................................... C07G 7/02
[58] Field of Search............ 195/31 R, 66 R, 63, 68; 210/52, 53, 54

[56] References Cited
UNITED STATES PATENTS

| | | | |
|---|---|---|---|
| 3,483,090 | 12/1969 | Barton | 195/66 R |
| 3,502,545 | 3/1970 | Westman et al. | 195/66 R |
| 3,650,900 | 3/1972 | Levin et al. | 195/68 |

*Primary Examiner*—Lionel M. Shapiro
*Attorney, Agent, or Firm*—Louis E. Davidson

[57] ABSTRACT

Transglucosidase impurity can be removed from amyloglucosidase solutions by mixing such solutions with a polyacrylic acid to form a precipitate with transglucosidase and then separating the precipitate from the so-purified amyloglucosidase. Useful polyacrylic acids have a molecular weight of at least about one million.

4 Claims, No Drawings

REMOVAL OF TRANSGLUCOSIDASE FROM AMYLOGLUCOSIDASE

BACKGROUND AND PRIOR ART

Amyloglucosidase, an enzyme which has also been referred to as glucamylase, glucogenic enzyme, starch glucogenase, gamma-amylase and α-1,4,glucan glucohydrase, is a well-known material which catalyzes the hydrolysis of starch to dextrose. This enzyme appears to aid in the formation of dextrose directly from starch without the production of intermediate products, such as higher sugars and soluble dextrins. This enzyme is also capable of catalyzing the hydrolysis of intermediate starch hydrolysis products to dextrose.

Amyloglucosidase is known to be prepared by fermentation processes employing certain strains of fungi belonging to the *Aspergillus niger* group and certain strains of *Rhizopus* species. Illustrative fungi are those of the species *Aspergillus niger, Aspergillus oryzae, Rhizopus delemar, Aspergillus phoenicis* and the like.

The fungal strains producing amyloglucosidase are also known to produce other enzymes, such as transglucosidase. Transglucosidase is also called transglucosylase. Transglucosidase promotes the formation, particularly from maltose and glucose, of unfermentable carbohydrates. When transglucosidase is present as a contaminant in amyloglucosidase employed to hydrolyze starch to dextrose, lower yields of dexttrose are obtained than if the transglucosidase were absent. The presence of transglucosidase in the usual amyloglucosidase preparations has been generally recognized and considerable work has been carried out to reduce and substantially eliminate the transglucosidase impurity in amyloglucosidase.

Prior art methods for removing transglucosidase from amyloglucosidase have employed clay, synthetic magnesium silicate, Fuller's earth, and ion-exchange materials to selectively absorb the transglucosidase. Selective precipitation of the transglucosidase impurity has also been employed. These prior art purification methods were generally unsatisfactory for commercial treatment of amyloglucosidase.

SUMMARY OF THE INVENTION

In accordance with the present invention, a process is provided for removing transglucosidase impurities from amyloglucosidase which comprises mixing an amyloglucosidase solution containing transglucosidase impurity with a polyacrylic acid to form a precipitate between the transglucosidase and the polyacrylic acid and then separating the precipitate from the amyloglucosidase. This process has the advantage of removing substantial amounts of transglucosidase without also removing appreciable amounts of amyloglucosidase.

DESCRIPTION OF THE INVENTION

The process of the present invention is useful for purifying amyloglucosidase in various forms. It can be in the form of aqueous whole cultures and fermentation beers known in the art. It can also be in the form of dried material which is then dissolved in aqueous media for use in the present process. The concentration of amyloglucosidase in the aqueous solution is not critical. As is known in the art, dilute solutions will require large quantities of liquid material to be processed in order to purify a given quantity of amyloglucosidase. The more concentrated solutions will enable a given quantity of amyloglucosidase to be purified with less effort and in a shorter period of time.

The polyacrylic acids useful in the present invention are well-known in the art and are prepared by polymerization of acrylic acid or acrylic acid derivatives, such as acrylamide or acrylic esters, with subsequent hydrolysis to generate free carboxyl groups. It is preferred that the polyacrylic acid have a molecular weight of at least about 1 million. It is especially preferred that the polyacrylic acid have an average molecular weight of about 3 to 5 million. Suitable polyacrylic acids are marketed under the trade names Carbopol 934, 940, 941, 960 and 961 by the B. F. Goodrich Chemicals Co. These finely-divided materials are all soluble or readily dispersible in water.

In the practice of this invention an aqueous solution of amyloglucosidase is mixed with the polyacrylic acid or a solution of the polyacrylic acid. The polyacrylic acid is employed in an amount such that the resulting mixture contains from about 0.1 to about 1 percent (weight/volume basis) polyacrylic acid based on the total volume of the mixture. The pH of the amyloglucosidase solution should be in the range of from about 2 to about 6 when it is mixed with the polyacrylic acid. When the pH is below about 2, the amyloglucosidase tends to become inactive. When the pH is above about 6, no precipitate will form. Preferably the pH is from about 3 to about 4. The mixing temperature is from about 0° to about 50°C., preferably from about 15° to about 40°C. When the temperature is below about 0°C., the amyloglucosidase solutions will tend to freeze. When the temperature is above about 50°C., substantially all amyloglucosidase activity is lost. The mixing time is from about 15 to about 90 minutes, preferably from about 30 to about 60 minutes. The resulting precipitate can be separated by well known methods, such as filtration, centrifugation, or decantation.

The process of the present invention removes transglucosidase from amyloglucosidase with minimum loss of amyloglucosidase. Well known methods are employed for determining amyloglucosidase content (defined in terms of activity units per ml.) of starting material and of purified material to measure amyloglucosidase recovery. Transglucosidase removal is determined by incubating a maltose solution with the amyloglucosidase purified by the present process and measuring the amount of isomaltose reversion product so produced and comparing this with the isomaltose produced by incubating a maltose solution with unpurified amyloglucosidase. The higher the isomaltose production, the higher will be the transglucosidase content.

The methods for determining amyloglucosidase activity and transglucosidase activity are described below:

Amyloglucosidase Activity

An aqueous solution is prepared containing 4.0 g. of soluble starch (moisture-free basis) and 5.6 ml. of 1.1 M acetate buffer, pH 4.2, per 100 ml. Exactly 50 ml. of the buffered starch solution is pipetted into a 100 ml. volumetric flask and equilibrated in a water bath at 60°C. for 15 minutes. Then 1.0 ml. of enzyme solution, properly diluted so that 20 to 30 percent hydrolysis will occur during the incubation period, is added and mixed. After exactly 60 minutes of incubation in the water bath at 60°C., the solution is adjusted to a pink phenolphthalein end point by adding 2N sodium hydroxide. The solution is then cooled to room temperature and diluted to volume with distilled water. Reducing sugar, calculated as dextrose, is determined on the diluted sample and on a blank solution treated in the same way but with no added enzyme. Dextrose content is conveniently determined by the well-known Schoorl method described in National Bureau of Standards Circular C-440, "Polarimetry, Saccharimetry and the Sugars", pp. 192–193 (1942). Amyloglucosidase activity is calculated from the formula:

$$A = \frac{S - B}{E},$$

where
- $A$ = amyloglucosidase activity, units per ml. of enzyme preparation.
- $S$ = reducing sugars in enzyme treated sample, grams per 100 ml. diluted sample.
- $B$ = reducing sugars in blank, grams per 100 ml. diluted sample.
- $E$ = amount of enzyme used, ml. per 100 ml. diluted sample.

Transglucosidase Activity

A solution of maltose is prepared by dissolving 100 g. C.P. maltose in distilled water and diluting to 500 ml. A 50 ml. portion of this 20 percent (weight/volume basis) maltose solution is then placed in a 100 ml. flask and diluted to 100 ml. with distilled water. To the flask containing a 10 percent (weight/volume basis) maltose solution is added 5 ml. of 1.9 M sodium acetate buffer at pH 4.0. After mixing, an amount of enzyme preparation containing 5.0 units of amyloglucosidase activity is added. The flask is placed in a 60°C. water bath and heated for 72 hours. At the end of this incubation period, the isomaltose content of the resulting solution is measured by conventional gas-liquid-chromatography methods.

The present invention will be further described in the following illustrative examples.

EXAMPLE 1

An aqueous amyloglucosidase solution was obtained by fermenting an aqueous corn mash with a fungal strain of the *Aspergillus niger* group and then filtering off the mycelium. A 500 liters portion of the filtrate having a pH of 3.6 and at a temperature of 24°C. was mixed with 100 liters of a 2 weight percent aqueous solution of Carbopol 934, which is a polyacrylic acid having an average molecular weight of about 3 to 5 million and is marketed by the B. F. Goodrich Chemicals Co. The concentration of polyacrylic acid in the resulting mixture was 0.33 percent (weight/volume basis). After the addition of the polyacrylic acid, the pH of the resulting amyloglucosidase solution dropped to 3.55. This mixture was then agitated for 30 minutes during which time a precipitate formed. The resultant mixture was filtered. The filtrate contained 95 percent of the original amyloglucosidase activity. The transglucosidase activity of the filtrate was only about one-tenth that of the original solution.

EXAMPLE 2

The procedure of Example 1 was followed wherein 2 liters of an amyloglucosidase solution having a pH of 3.4 were mixed at 16°C. with 100 ml. of a 2 weight percent aqueous solution of Carbopol 941, which is a polyacrylic acid having a molecular weight of about 1 million and is marketed by the B. F. Goodrich Chemicals Co. The concentration of polyacrylic acid in the resulting mixture was 0.1 percent (weight/volume basis). This mixture was then agitated for 1 hour and the resulting precipitate was removed by filtration. The filtrate contained substantially 100 percent of the original amyloglucosidase activity. The transglucosidase activity was only about one-tenth that of the original solution.

EXAMPLE 3

An aqueous corn mash was fermented with a fungal strain of the *Aspergillus niger* group. A 1000 gallons portion of the unfiltered fermentation beer having a pH of 3.8 was mixed at room temperature (about 25°C.) with 160 gallons of water containing a dispersion of 26 pounds of Carbopol 934. The concentration of polyacrylic acid in the resulting mixture was 0.27 percent (weight/volume basis). After 30 minutes of gentle agitation, the material was filtered on a pre-coated vacuum drum filter. The filtrate contained 84.2 percent of the original amyloglucosidase activity. Substantially all of the original transglucosidase activity was removed from the filtrate.

What is claimed is:
1. A process for removing transglucosidase from amyloglucosidase solutions which comprises mixing an amyloglucosidase solution containing transglucosidase with a polyacrylic acid at a pH from 3 to 4 to form a precipitate between the transglucosidase and the polyacrylic acid and then separating the precipitate from the amyloglucosidase.

2. A process according to claim 1 wherein the concentration of the polyacrylic acid is from about 0.1 to about 1 percent based on the total volume of the mixture.

3. A process according to claim 1 wherein the mixing temperature is from about 0° to about 50°C. and the mixing time is from about 15 to about 90 minutes.

4. A process according to claim 1 wherein the mixing temperature is from about 15° to about 40°C. and the mixing time is from about 30 to about 60 minutes.

* * * * *